(12) United States Patent
Sawada

(10) Patent No.: US 6,950,128 B1
(45) Date of Patent: Sep. 27, 2005

(54) INFORMATION STORAGE MEDIUM WITH A ROTATABLY MOUNTED CAMERA

(75) Inventor: Takeshi Sawada, Tokyo (JP)

(73) Assignee: Sony Corporation, Tokyo (JP)

( * ) Notice: Subject to any disclaimer, the term of this patent is extended or adjusted under 35 U.S.C. 154(b) by 794 days.

(21) Appl. No.: 09/711,415

(22) Filed: Nov. 13, 2000

(30) Foreign Application Priority Data

Nov. 15, 1999 (JP) ................. P11-324444

(51) Int. Cl.[7] ............................................. H04N 5/76
(52) U.S. Cl. ..................... 348/231.3; 348/207.1; 348/231.2; 348/373
(58) Field of Search ............ 348/231.1–231.6, 348/231.99, 207.1, 207.99, 373, 376, 552

(56) References Cited

U.S. PATENT DOCUMENTS

| 5,528,293 A | 6/1996 | Watanabe | |
|---|---|---|---|
| 5,708,853 A * | 1/1998 | Sanemitsu | 348/552 |
| 5,808,672 A | 9/1998 | Wakabayashi et al. | |
| 6,118,485 A * | 9/2000 | Hinoue et al. | 348/373 |
| 6,654,050 B2 * | 11/2003 | Karube et al. | 348/207.1 |
| 6,670,985 B2 * | 12/2003 | Karube et al. | 348/207.1 |

FOREIGN PATENT DOCUMENTS

| EP | 0683596 | 11/1995 |
|---|---|---|
| EP | 0757478 | 2/1997 |
| JP | 08183176 | 6/1996 |

* cited by examiner

*Primary Examiner*—Tuan Ho
*Assistant Examiner*—Gevell Selby
(74) *Attorney, Agent, or Firm*—Jay H. Maioli

(57) ABSTRACT

The picture signal picked up by a MOS sensor 2a in the camera 2 is supplied to the storage medium body 3, converted to image data by the A/C converter 4, then digitally processed by the image processor 5 to be still image data or compressed image data composed of R, G and B image signals, for example, and then written into the RAM 7. Writing of the image data to the RAM 7 is made by access to the RAM 7 according to the directory structure in the ROM 6 and RAM.

4 Claims, 6 Drawing Sheets

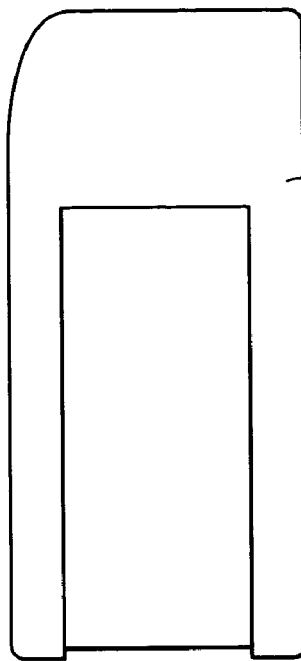
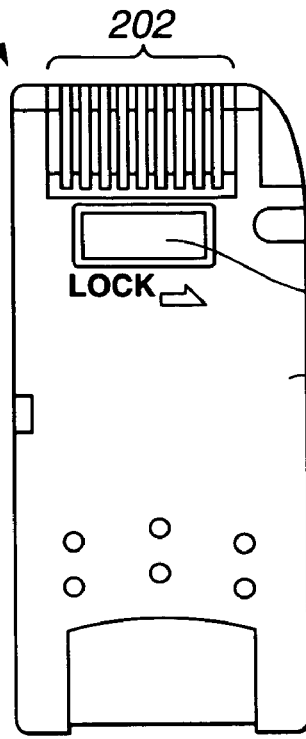
FIG.1A     FIG.1B
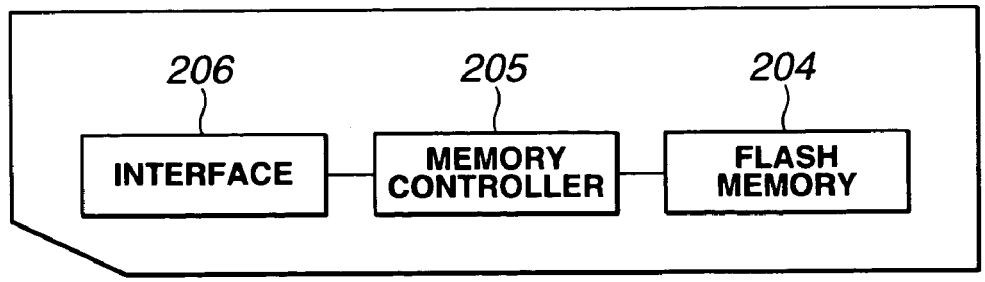
FIG.2

INFORMATION STORAGE MEDIUM WITH A ROTATABLY MOUNTED CAMERA

BACKGROUND OF THE INVENTION

1. Field of the Invention

The present invention relates to a semiconductor storage medium removably installable in an electronic device.

2. Description of the Related Art

Recently, various data recording and/or playback apparatuses such as a digital still camera have been prevailing. There has been developed a variety of external memories removably installable in such electronic devices and are also portable. Typical ones of the external memories are semiconductor memories such as a flash memory.

Such an external memory can record together data whose formats are different from each other, such as still image data, moving image data, audio data (music data), etc. Therefore, the user can use such an external memory in common with a plurality of electronic devices which deal with data whose formats are different from each other.

Namely, the user can use the external memory with a digital still camera for example to play back and view still image data stored in the external memory. Alternatively, the user can use the external memory with a digital video camera for example to play back and view moving image data recorded in the external memory.

As one example of the external memories, there is available a conventional semiconductor memory having an appearance as shown in FIGS. 1A and 2B. The semiconductor memory is generally indicated with a reference 200. The semiconductor memory 200 is encased in a housing 201 having a length of 50 mm, width of 21.5 mm and a thickness of 2.8 mm for example. The semiconductor memory 200 further has a 10-pin terminal 202 through which a state of a serial bus, various data, clock, etc. are sent when the semiconductor memory 200 is installed in an external electronic device. In addition, the semiconductor memory 200 has a safety switch 203 provided to prevent data recorded in the semiconductor memory 200 from inadvertently being erased.

As shown in FIG. 2, the semiconductor memory 200 further includes a flash memory 204 of several megabytes to tens megabytes for example to store various data from the electronic device in which it is installed, a memory controller 205 to manage the content of the flash memory 204, and an interface 206 provided for connection to the electronic device and to and from which various data are supplied and delivered.

In the semiconductor memory 200, only three pins, data, clock and bus state, respectively, of the 10-pin terminal 202 are used to send the data, clock and bus state between the semiconductor memory 200 and electronic device. Note that the clock and bus state are supplied from the electronic device to the semiconductor memory 200 while the data is sent between the semiconductor memory 200 and electronic device by the bidirectional half-duplex transfer. To send a control packet as the data between the semiconductor memory 200 and electronic device, the maximum frequency of the clock is 20 MHz for example and an error check code in units of 512 bytes is added to the control packet.

The semiconductor memory 200 operates according to a protocol of the serial interface under the control of the memory controller 205 to control the flash memory 204.

More specifically, if the semiconductor memory 200 uses the flash memory 204 including a plurality of flash memories for example, each of the flash memories is controlled by the memory controller 205. Also, if the semiconductor memory 200 uses the flash memory 204 including, for example, a plurality of flash memories whose types are different from each other, the memory controller 205 controls each of the flash memories according to the characteristic of each flash memory, and corrects error correspondingly to the error characteristic of each flash. Further, the semiconductor memory 200 converts parallel data to serial data by the memory controller 205.

Since the semiconductor memory 200 operates according to the protocol of the serial interface under the control of the memory controller 205, it can employ any of the currently available flash memories.

The semiconductor memory 200 uses a hierarchical file system based on FAT (file allocation table) normally installed in personal computers. Based on the FAT-based hierarchical file system, the semiconductor memory 200 stores into the flash memory 204 a plurality of data whose formats are different from each other, such as still image data, moving image data, audio data (music data) and voice data (speech data), and controls the content of the flash memory 204 by the memory controller 205. In the semiconductor memory 200, a file format and directory management method used for recording data in the flash memory 204 are previously defined for each data format. The semiconductor memory 200 manages data recorded into the flash memory according to the defined format and directory management method.

More specifically, as shown in FIG. 3, there are recorded in the root directory in the flash memory 200 "MEM***.ind" which is a file indicating the type of the semiconductor memory 204, "DCMI" which is a directory in which f still picture file is stored, "VOICE" which is a directory in which a voice file is stored, "HIFI" which is a directory in which an audio file is stored, "CONTROL" which is a directory in which appended information such as control information file is stored, and "MS***" which is a directory in which information peculiar to the vendor is stored.

The semiconductor memory 200 adopts as the still image data format called DCF (design rule for camera file system) standardized by the JEIDA (Japanese Electronic Industry Development Association), and as the format of audio data ADPCM (adaptive difference pulse code modulation) of the Recommendation G.726 of the ITU-T (International Telecommunication Union).

The user can use the semiconductor memory 200 as an external memory in common with a plurality of electronic devices which deal with data whose formats are different from each other.

The semiconductor memory 200 can be used as in the following for example. With the semiconductor memory 200 installed in a digital still camera, image data is stored into the semiconductor memory 200. The semiconductor memory 200 is removed from the digital still camera, and installed into a personal computer for example. The image data thus stored in the semiconductor memory 200 can be transferred to a recording medium in the personal computer, printed out by a printer connected to the personal computer or displayed on a monitor provided on or connected to the personal computer.

However, if the semiconductor memory is not installed in the digital still camera when it is desired to pick up an object easily and instantly, it is not possible to timely trip the camera shutter.

Of a system in which while an object is being picked up, a captured picture is displayed on the monitor of a personal computer, the camera such as the digital still camera is too large to easily carry on.

OBJECT AND SUMMARY OF THE INVENTION

It is therefore an object of the present invention to overcome the above-mentioned drawbacks of the prior art by providing a semiconductor storage medium capable of timely storing image data of an object the moment the object is picked up.

The above object can be attained by providing a semiconductor storage medium including according to the present invention:
a housing;
a camera mounted on the housing;
an image processor for generating image data from a picture signal captured by the camera; and
a first memory for storing the image data supplied from the camera.

In the above semiconductor storage medium, there are further provided a second memory for storing control information and a controller for controlling the access to the first memory based on the control information stored in the second memory.

Also in the above semiconductor storage medium, the camera is rotatable through 180 deg. in relation to the housing.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 1 shows the appearance of the conventional semiconductor memory widely used;

FIG. 2 is a block diagram of the conventional semiconductor memory in FIG. 1;

DETAILED DESCRIPTION OF THE PREFERRED EMBODIMENTS

Figure 3:
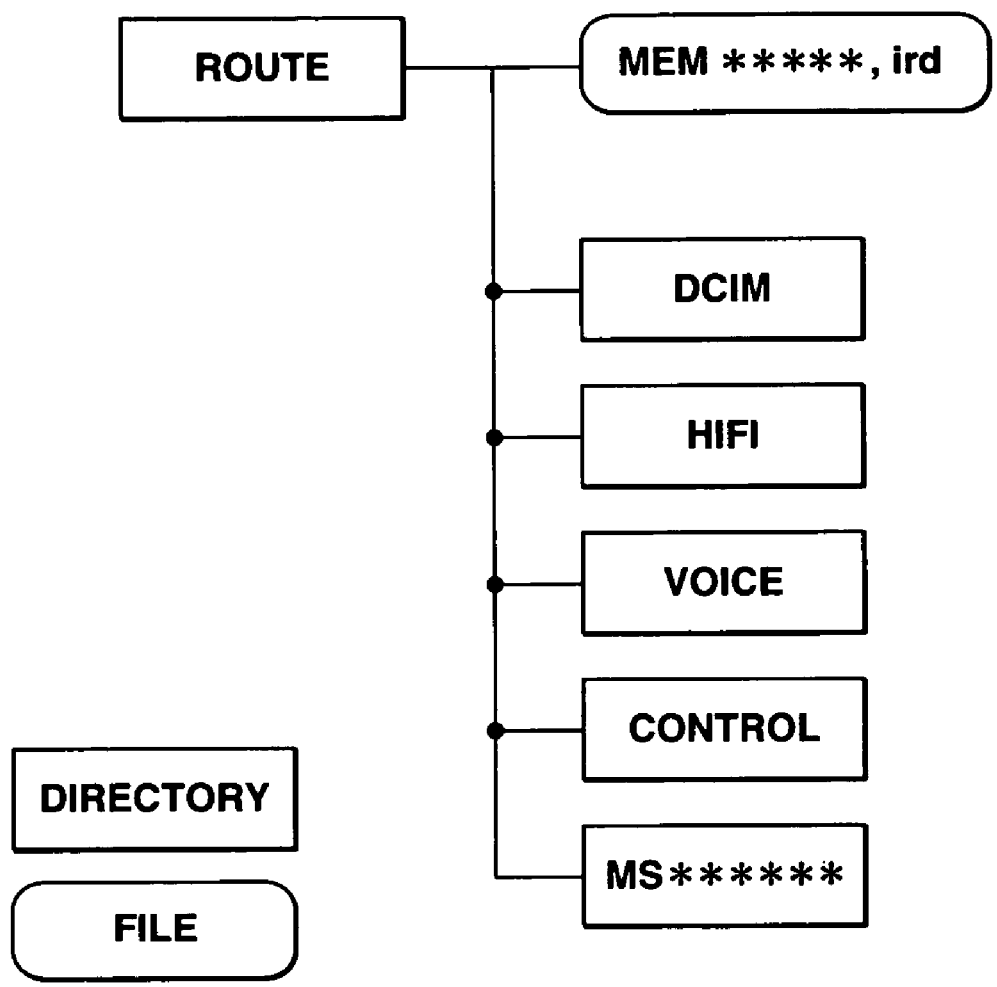
FIG. 3 shows the construction of the root directory of a flash memory forming the conventional semiconductor memory in FIG. 1.
Figure 4:
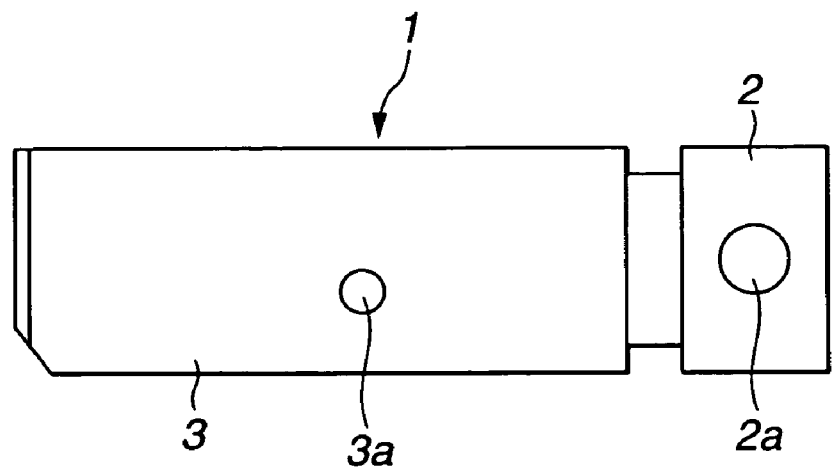
FIG. 4 is a plan view showing the appearance of an embodiment of the card-type semiconductor storage medium with a camera according to the present invention.

Referring now to FIG. 4, there is illustrated in the form of a plan view an embodiment of the card-type semiconductor storage medium according to the present invention. The card-type semiconductor storage medium is of a portable and removable type provided with a camera. As shown, the card-type semiconductor storage medium is generally indicated with a reference 1.

The camera is indicated with a reference 2. It includes an image sensor 2a such as a MOS sensor. The semiconductor storage medium 1 further includes a storage medium body 3 which deals with digital image data. The storage medium body 3 is provided downstream of an A/D converter which will further be described later. The storage medium body 3 is provided with a shutter 3a which may otherwise be provided on the camera 2.

Figure 5A:
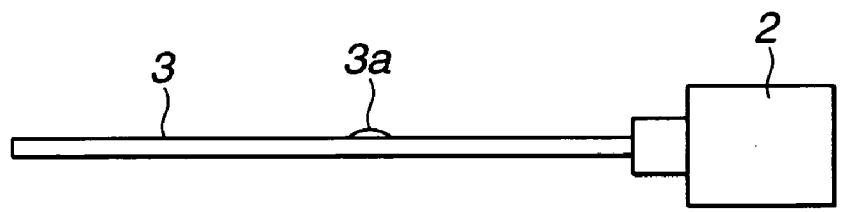
FIG. 5 is a side elevation of the card-type semiconductor storage medium with the camera in FIG. 4, explaining the rotation of the camera of the card-type semiconductor storage medium in FIG. 4.
Figure 5B:
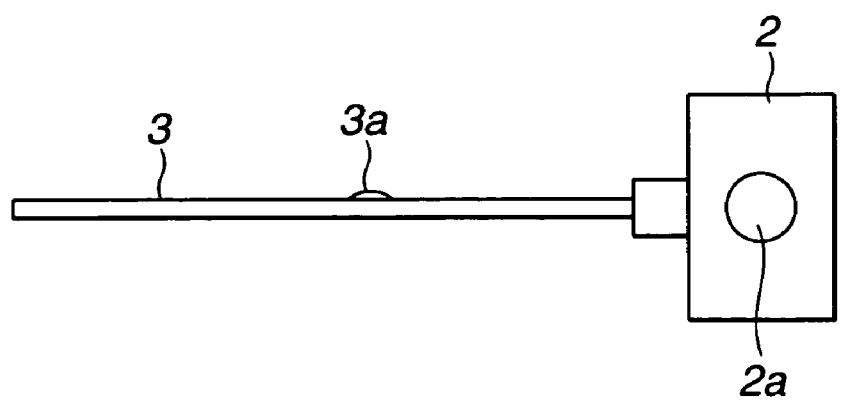

The camera 2 is rotatable through an angle of 180 deg. relative to the storage medium body 3. FIG. 5A is a side elevation of the card-type semiconductor storage medium 1 with the camera 2, explaining the rotation of the camera 2. That is, the camera 2 shown in FIG. 5B is rotated through 90 deg. from the state of the camera 2 shown in FIG. 5A. The camera 2 can further be rotated from the state shown in FIG. 5B. Even when the camera 2 is rotated to such angles, it can pick up an object.

Figure 6:
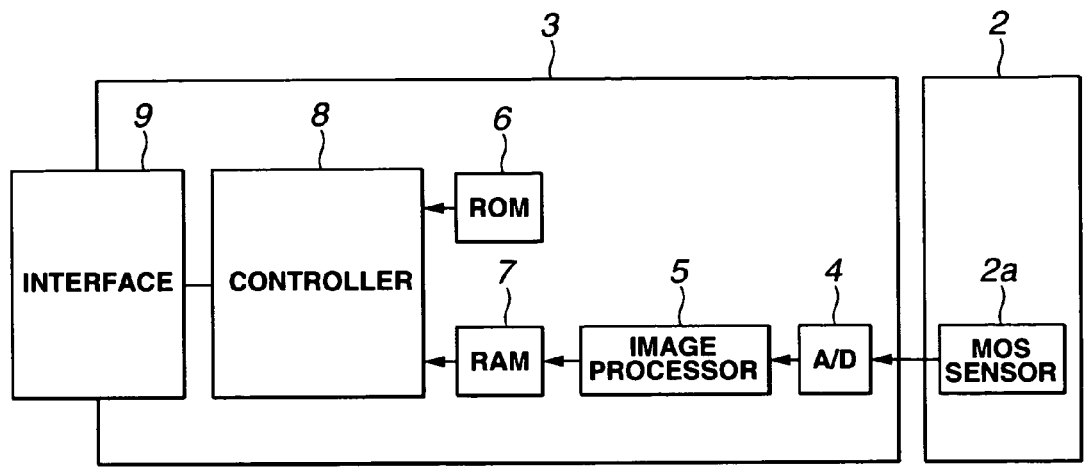
FIG. 6 is a block diagram of the card-type semiconductor storage medium with the camera in FIG. 4.

Referring now to FIG. 6, there is schematically illustrated in the form of a block diagram the card-type semiconductor storage medium 1 with the camera 2. As shown, a picture signal picked up bu the MOS sensor 2a of the camera 2 is supplied to the storage medium body 3, converted to image data by the A/D converter 4, then digitally processed by an image processor 5 to be still image data or compressed image data composed of R, G and B image signals for example, and then stored into a RAM 7. Write of the image data to the RAM 7 is made by access to the RAM 7 according to the directory structure in the ROM 6 and RAM 7. Access to the ROM 6 and RAM 7 is controlled by the controller 8. The card-type semiconductor storage medium 1 with the camera 2 is connected to a personal computer for example via an interface 9.

Figure 7:
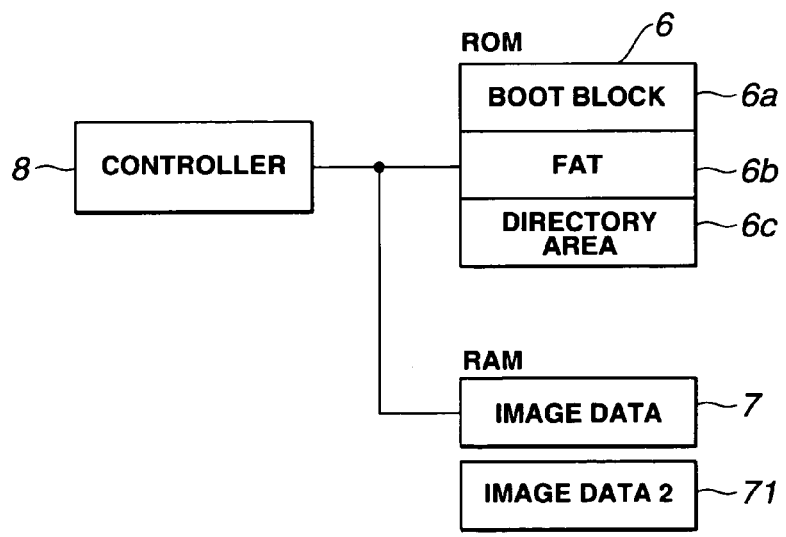
FIG. 7 explains the details of a ROM and RAM provided in the card-type semiconductor storage medium with the camera in FIG. 4.

The ROM 6 is a read-only memory in which information for enabling the access to a file according to the directory structure. As shown in FIG. 7, the ROM 6 has a boot block 6a, FAT (file allocation table) area 6b normally installed in personal computers for example, and a directory area 6c.

The RAM 7 stores at least one image data resulted from digital processing by the A/D converter 4 and processing by the image processor 5 of the picture signal from the camera 2, and an image data file in the RAM 7 is accessible from outside such as a personal computer.

More specifically, the access to the image data file is enabled based on information written in the ROM 6 and intended to enable the file access according to the directory structure. The semiconductor storage medium 1 may include a plurality of RAMs 7i.

In the card-type semiconductor storage medium 1 with the camera 2, the storage medium body 3 is designed to have the same outside dimensions as the aforementioned semiconductor memory 200, has the same number of contacts, employs a serial interface, protects copyright data, and has a directory area to record the file and fixed management areas such as FAT in the ROM 6 as having been described in the above. The ROM is less expensive than the RAM such as flash memory and it is suitable for provision of the fixed areas therein. On the other hand, the RAM is used only as image data area. Thereby, the semiconductor storage medium can be manufactured with less total costs.

The card-type semiconductor storage medium 1 with the camera 2 constructed as in the above functions to record picture as will be described below. The picture is recorded when the user trips the shutter 3a in FIG. 4 to pick up an object. The picture recording is effected as shown in FIG. 9 whether or not the card-type semiconductor storage medium 1 with the camera 2 is inserted in a slot 12 of a personal computer 10 for example as shown in FIG. 8.

Figure 9:
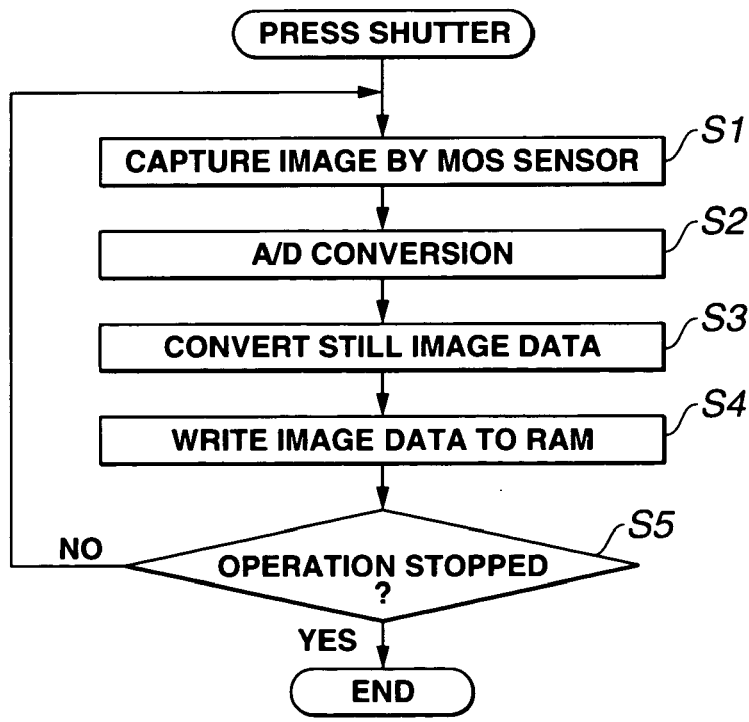
FIG. 9 is a flow chart of operations effected in image recording by the card-type semiconductor storage medium with the camera in FIG. 4.

First at step S1 in FIG. 9, a picture signal of the object is picked up by the MOS sensor 2a. The picture signal is converted to a digital signal by the A/D converter 4 at step S2, processed in a predetermined manner at step S3 to be still image data. The data conversion is made according to the still image data format called DCF (design rule for camera file system) standardized by the JEIDA (Japanese Electronic Industry Development Association). Thereafter, a step S4, the image data is written to the RAM 7 at an address defined by the FAT area 6b and directory area 6c stated in the ROM 6. In this case, the still image data is written in the directory "DCIM". Thereafter, the operations at steps S1 to S5 are repeated until it is determined at step S5 that the procedure is to be stopped.

The procedure shown in FIG. 9 is intended to write image data into the RAM 7 the moment the shutter 2a is tripped. However, it may be effected to always write it continuously into the RAM 7.

Figure 8:
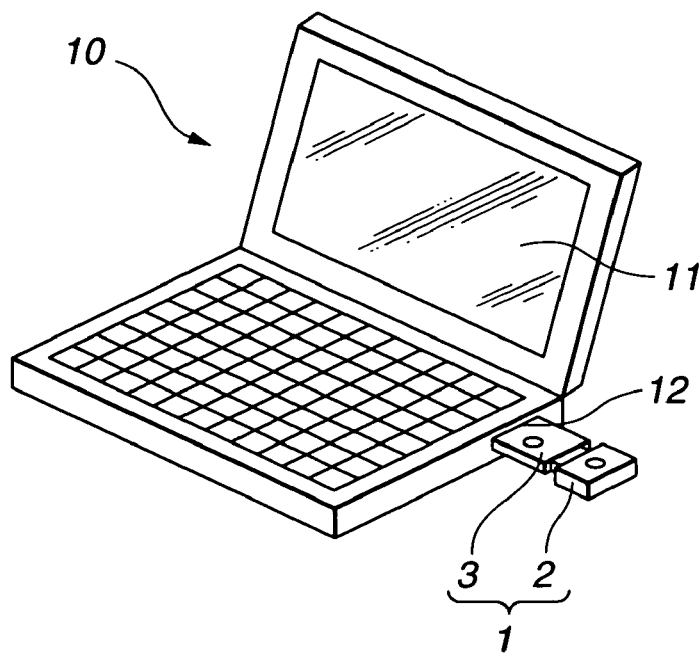
FIG. 8 shows the card-type semiconductor storage medium with the camera in FIG. 4, inserted into a dedicated slot of a personal computer.

Next, the procedure for acquiring image data with the card-type semiconductor storage medium 1 with the camera 2 inserted in the slot 12 of the personal computer 10 as shown in FIG. 8 will be described with reference to FIG. 10. The following operations are those effected after the request for image acquisition is received from the personal computer 1 in the state shown in FIG. 8.

First at step S11, address detection in the ROM 6 is started. Next at step S12, FAT information is detected, and directory information is detected at step S13 according to the FAT information, and an address of the directory "DCIM" is detected. At step S14, image data in the RAM 7 is searched. At step S15, it is judged whether the image data having been searched at step S14 is only displayed on a monitor 11 of the personal computer 10. When the image data is not to be displayed on the monitor 11, the image data is outputted from the RAM 7 via the interface 9 at step S16 in order to take the image data into the recording medium of the personal computer 10.

On the other hand, when the image data is to be displayed on the monitor 11, it is so displayed at step S17. Then the operations at steps S11 to S15 are repeated.

Figure 10:
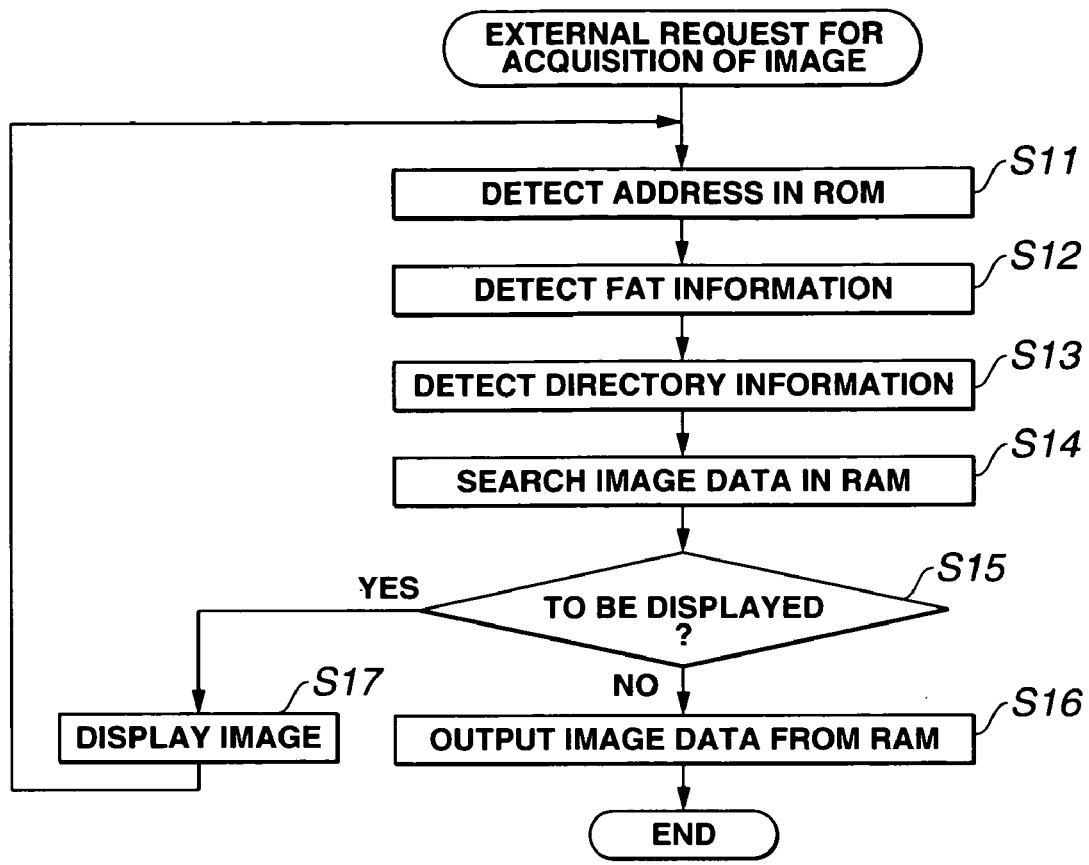
FIG. 10 is a flow chart of operations effected by the card-type semiconductor storage medium with the camera in FIG. 4 when an external request for image acquisition is received.

The image acquisition as shown in FIG. 10 may be done in parallel with the image recording as shown in FIG. 9.

Figure 11:
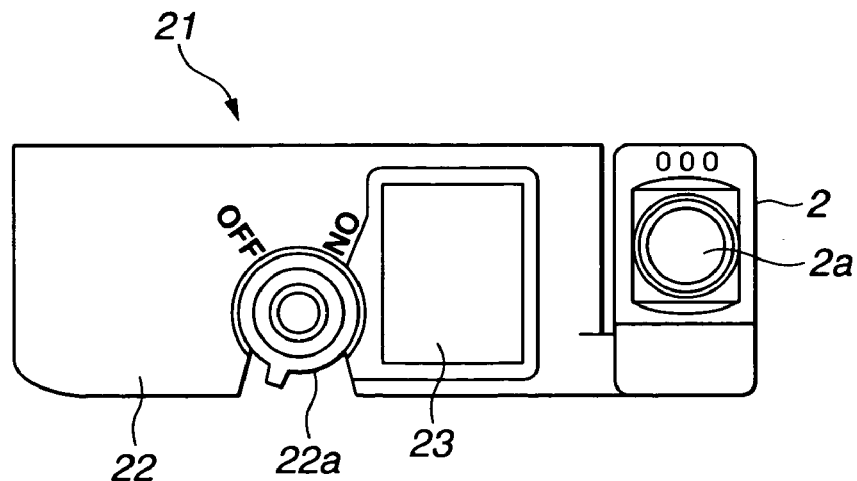
FIG. 11 shows another embodiment of the card-type semiconductor storage medium with the camera according to the present invention.

FIG. 11 shows another embodiment of the card-type semiconductor storage medium with the camera according to the present invention. The card-type semiconductor storage medium with the camera according to this embodiment is generally indicated with a reference 21. This card-type semiconductor storage medium 21 is a one provided with a monitor 23. As shown, it includes a storage medium body 22, shutter 22a, and a monitor 23 such as LCD in addition to the camera 2 using the MOS sensor 2a. The monitor 23 can display a picture picked up by the MOS sensor 2a.

What is claimed is:

1. A semiconductor storage medium device operable to couple with an apparatus for inputting and outputting data, the device comprising:
    a housing;
    an imaging unit mounted on said housing;
    an image processor for generating image data from a picture signal captured by said imaging unit;
    a first memory for storing a plurality of pieces of said image data supplied from said image processor;
    a second memory for storing control information for enabling access to said first memory; and
    a controller for controlling said access to said first memory based on said control information stored in said second memory, wherein
    said controller operates based on said control information stored in said second memory to store said image data and data having a format different from a format of said image data, in the form of a directory structure, in said first memory, and
    said controller holds said image data and said data having said format different from said format of said image stored in said first memory until said data is deleted in response to a user instruction.

2. The semiconductor storage medium device as set forth in claim 1, wherein said housing has the shape of a card.

3. The semiconductor storage medium device as set forth in claim 1, wherein said camera is rotatably mounted on said housing.

4. The semiconductor storage medium device as set forth in claim 1, wherein said first memory is a random-access memory and the second memory is a read-only memory.

* * * * *